F. A. STIERHEIM.
BELT GEARING.
APPLICATION FILED SEPT. 21, 1914.
1,213,430.
Patented Jan. 23, 1917.
3 SHEETS—SHEET 1.
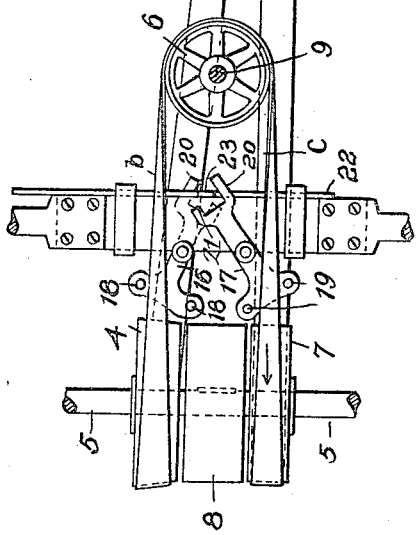

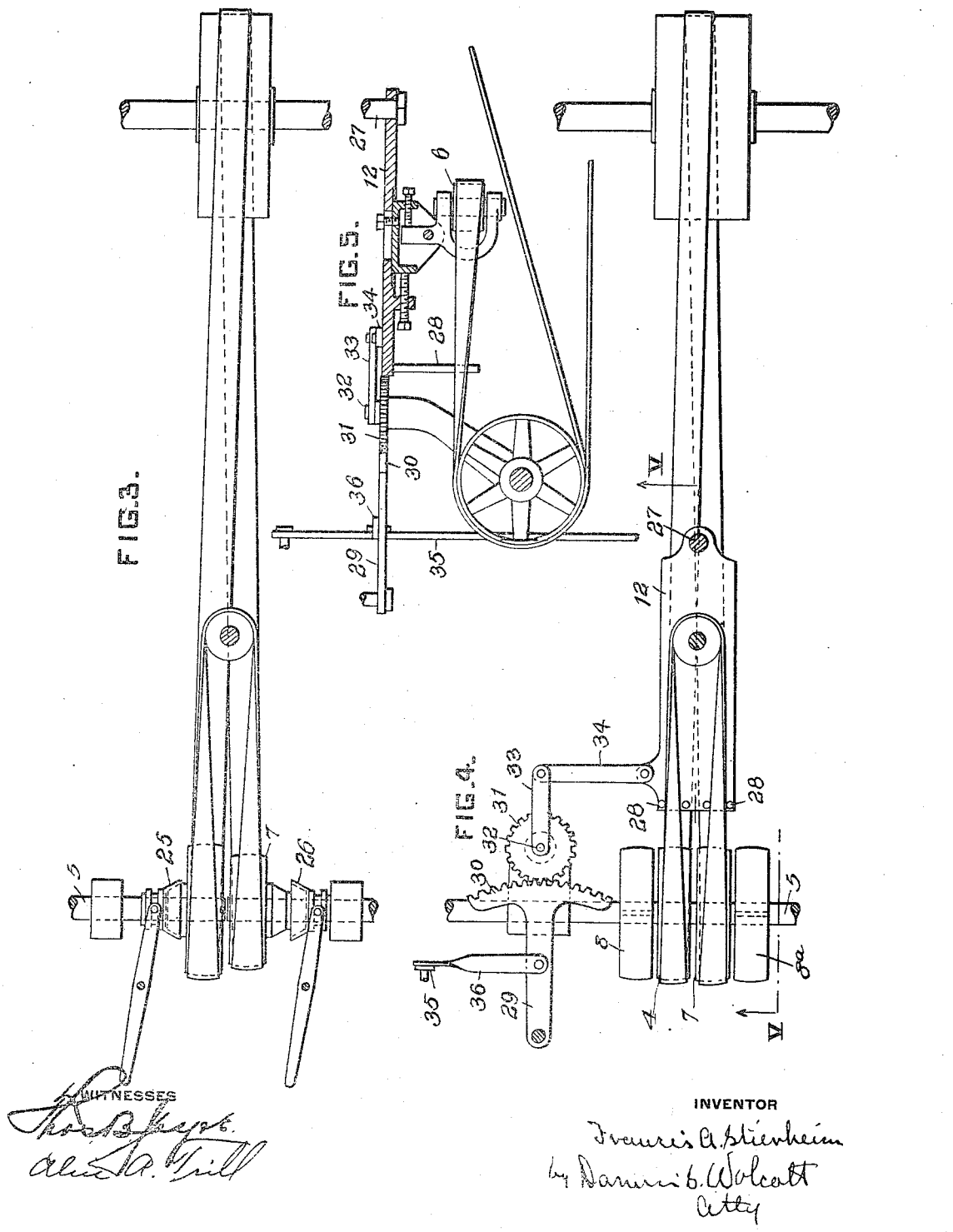

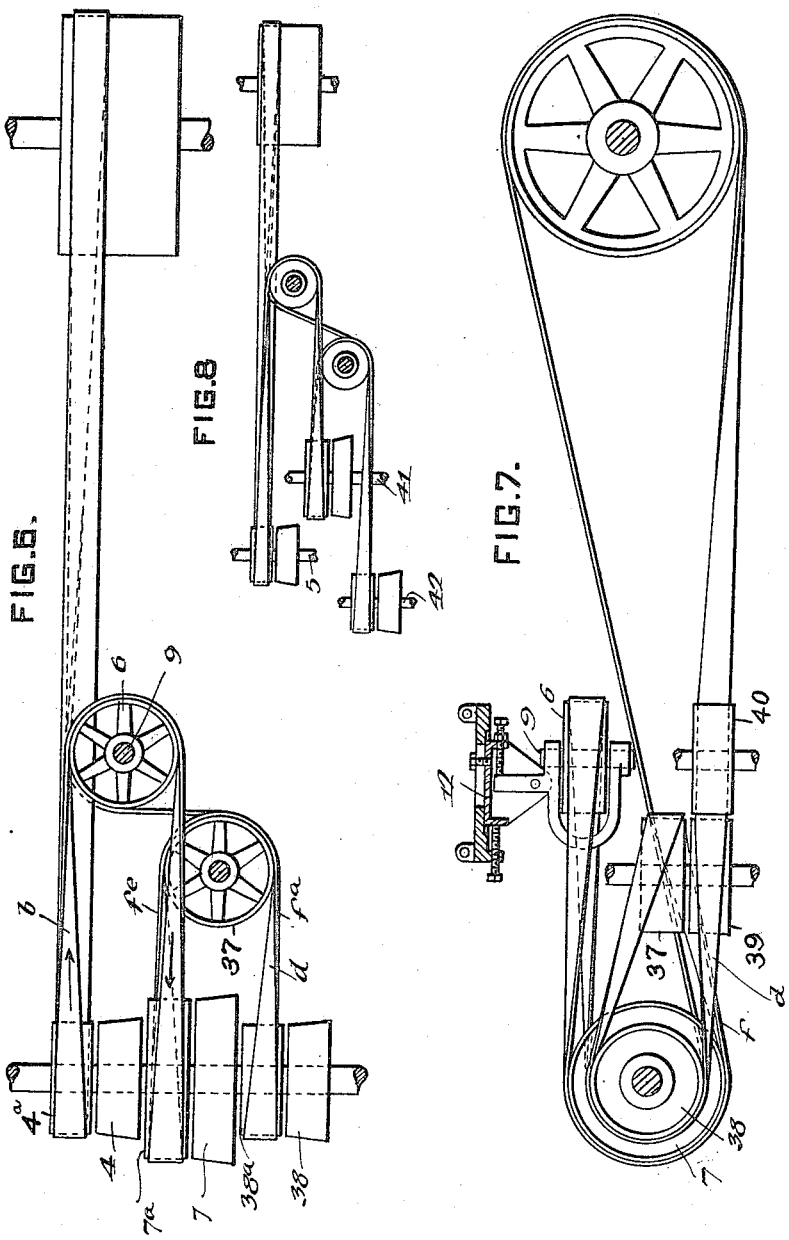

UNITED STATES PATENT OFFICE.

FRANCIS A. STIERHEIM, OF PITTSBURGH, PENNSYLVANIA.

BELT-GEARING.

1,213,430.  Specification of Letters Patent.  Patented Jan. 23, 1917.

Application filed September 21, 1914. Serial No. 862,718.

*To all whom it may concern:*

Be it known that I, FRANCIS A. STIERHEIM, residing at Pittsburgh, in the county of Allegheny and State of Pennsylvania, a citizen of the United States, have invented or discovered certain new and useful Improvements in Belt-Gearing, of which improvements the following is a specification.

The invention described herein relates to certain improvements in the transmission of power by belts.

Heretofore it has been customary to arrange the driving and driven pulleys in the loops at the ends of an endless belt, so that the driven pulley will always revolve in the same direction as the driving pulley, except of course where the belt is crossed between the pulleys when the driven pulley will rotate the reverse of the driving pulley. In cases where the direction of rotation of the driven pulley must be reversed, it is necessary to reverse the driving pulley or else to employ two belts, one of which is crossed extending from two narrow or one wide driving pulley to two independently mounted driven pulleys. And further when because desirable to change the speed of the driven shaft without increasing the speed of the driving shaft, the employment of cone or stepped pulleys on the driving and driven shafts was necessary.

The invention described herein has for its object the driving from one pulley always in the same direction of two or more pulleys, in the same or opposite directions and at the same or different rates of rotation, by a single belt.

The invention is hereinafter more fully described and claimed.

In the accompanying drawings forming a part of this specification, Figure 1 is a side elevation showing an arrangement of a driving pulley and two driven pulleys secured to a common shaft and the belt arranged to rotate the driven pulleys in opposite directions respectively; Fig. 2 is a view at right angles to Fig. 1 the mechanism employed for supporting and adjusting the idler being removed; Fig. 3 is a view similar to Fig. 2, showing the driven pulleys differing in diameter and mounted on independent shafts; Fig. 4 shows two driven pulleys secured to a common shaft and two pulleys loosely mounted on the shaft intermediate the driven pulleys, and showing the idler carried on a laterally movable frame; Fig. 5 is a sectional view on a plane indicated by the line V—V Fig. 4; Fig. 6 shows a plurality of pulleys of different dimension secured on a common shaft and a corresponding number of loose pulleys, the belt being arranged to drive adjoining pulleys in opposite directions; Fig. 7 is a view of the arrangement shown in Fig. 6, but at right angles to Fig. 6, and Fig. 8 shows pulleys on a plurality of shafts driven by a common belt.

While the transmission of power from the driving to the driven shaft or shafts is for convenience shown and described herein as being in a horizontal direction, it will be understood that the elements involved in the practice of my invention may be arranged to transmit power vertically or at any angle between vertical and horizontal.

In the practice of the invention the pulley 1 is secured to the driving shaft 2, and is made of a width dependent upon the number of parts or elements to be driven and their relative arrangement as hereinafter set forth. In the construction shown in Figs. 1 and 2 the section $a$ of the endless belt 3 passes from the pulley 1 to the underside of and partially around the pulley 4 on the shaft 5. The section $b$ of the belt passes from the upper side of the pulley to and partially around the idler 6 and from this idler the section $c$ of the belt passes to the upper side of and partially around the pulley 7 on the same shaft. The section $d$ of the belt passes from the underside of pulley 7 to the underside of and partially around the driving pulley 1. As the belt passes around the loose pulleys 4 and 7 in opposite directions they will be driven in opposite directions when the belt is in frictional engagement with them respectively, and when shifted from one loose pulley as 4 onto the table the tight pulley 8, the latter will be driven as the pulley 4. When the belt is shifted from loose pulley 7 onto the tight pulley 8, the latter will be rotated in a reverse direction.

As shown in Fig. 1 the idler 6 is loosely mounted on the pin or shaft 9 carried by the arms of a yoke 10 which is carried by a slide 11 mounted on the base 12. The slide can be shifted along the base, which can be secured to any suitable support, by means of the screw 13 to increase the tension of the belt. In order to insure that the belt will remain on the idler its face should be at right angles to the section $a$ of the belt, and as it is difficult to secure and maintain the base 12 so that the face of the idler shall be in proper position, the yoke 10 is pivotally mounted in the slide as shown in Fig. 1 and is provided with a lug 14 bearing on the screw 15, so that by turning the latter the pulley can be properly adjusted.

In will be observed that in my improved construction the ends of the belt can be secured together after being passed around the driving pulley and the belt then adjusted to position on the other pulleys and idler. It is characteristic of my improvement that not only can the driven part or parts be rotated in opposite directions by a single belt without reversing the driving element, but the belt can by a proper location of the idler be caused to engage the driven pulleys for greater portions of their peripheries than is possible under the present practice. This more efficient driving engagement of the belt with the pulleys can be brought about by so supporting the idler that it will be intermediate the belt and a line tangential to the upper portion of the peripheries of the pulleys 1 and 4 in Fig. 1.

Any suitable construction of belt shifter may be employed for shifting the belt from the pulleys 4 and 7 to the tight pulley 8 and the reverse, such for example as that shown in Fig. 2, consisting generally stated of two levers 16 and 17 pivotally mounted on a suitably supported base and provided respectively at one end with pins 18 and 19, the pins 18 projecting downward along opposite edges of the section $a$ of the belt and the pins 18 in lever 17 projecting upwardly along opposite edges of the section $c$ of the belt. At their opposite ends the levers are provided each with a long and a short prong 20 and 21 and on the frame is mounted a slide 22 provided on opposite edges with lugs 23. These lugs are so located that when the slide is moved down in Fig. 2 the lug 23 will engage prong 20 on lever 17 and shift the belt from pulley 7 to pulley 8.

In order that a belt may not work off the face of a driven pulley, the face of the latter should be at right angles to the driving portion of the belt. As for example, the driving portion $a$ of the belt is at an angle to the axis of the shaft 5, carrying the pulley 4, and in order to prevent the belt working off the pulley 4, the face of the latter is so constructed as to be at right angles to the portion $a$ of the belt as shown in Figs. 2, 6 and 8. The angle of inclination of the face of the driven pulley to its axis should vary in accordance with the angle which the driving portion of the belt forms with the axis of the driven pulley.

In Fig. 3 two pulleys 4 and 7 are shown loosely mounted on the shaft 5 but adapted to be connected alternately to the shaft by clutch mechanisms 25 and 26. The belt 3 is arranged as shown in Figs. 1 and 2 so as to rotate the pulleys 4 and 7 in opposite directions. As shown in Fig. 3 the driven pulleys may differ in diameter although driven by the same belt from a common driving pulley.

In Figs. 4 and 5, two loose pulleys 4 and 7 are shown intermediate the tight pulleys 8 and $8^a$ which are secured to the shaft 5. The base 12 of the slide 11 carrying the idler 6 is mounted to swing on the pivot pin 27 preferably arranged with its axis in a plane passing between the loose pulleys 4, 7. By shifting the base on its pivot pin the belt sections can be shifted from the loose to the tight pulleys. While the swinging of the idler is effective to shift the belt, the lateral movements of the belt are sluggish and in order to accelerate these movements it is preferred to arrange pins 28 on the base on opposite sides of the belt sections moving onto the pulleys on shaft 5, as clearly shown in Fig. 4. The base 12 may be shifted by any suitable means, such for example as that shown in Fig. 4. A pivotally mounted arm 29 is provided with a toothed segment 30 intermeshing with a pinion 31 on a shaft 32 which carries a rocker arm 33 having its outer end connected to the base 12 by a link 34. The arm 29 is shifted by a lever 35 connected to the arm by a link 36.

In Figs. 6 and 7 a plurality of pulleys is shown driven by the same belt, the pulleys differing in diameter so that the speed of the shaft 5 may be changed by shifting one portion of the belt onto a loose pulley and another onto a tight pulley either larger or smaller than the tight pulley from which the first portion of the belt was shifted. In the construction shown in Figs. 6 and 7, the section $a$ of the belt passes below the tight and loose pulleys 4, $4^a$, the section $b$ to and around the idler 6, the section $c$ above the tight and loose pulleys 7, $7^a$, the section $e$ to and around a second idler 37, the section $f$ below the tight and loose pulleys 38, $38^a$, and the section $d$ partially around idlers 39 and 40 to the underside of the driving pulley 1. The idler 6 is carried by a slide 12 as shown in Fig. 7, for the adjustment of the tension of the belt, as hereinbefore described. The idler 37 need not be adjusted and may be supported in any suitable manner known in the art. The idlers 39 and 40 serve principally as guides to return the section $d$ of the belt to a line of movement to pass to and around the driving pulley. The idler 39 may be loosely mounted on the shaft carrying the idler 37 and the idler 40 may be loosely mounted on the pin or shaft 9 carrying the idler 6 or otherwise suitably supported. With the belt arranged around the driven pulleys as shown in Figs. 6 and 7, said pulleys will be rotated alternately in opposite directions, but it will be readily seen that the belt may be so arranged that all the pulleys may be driven in the same direction which may be the same or the reverse of the direction of rotation of the driving pulley.

As will be seen by reference to Fig. 8, the driven pulleys may be arranged on independent shafts 5, 41 and 42, all of which may be driven in the same direction, or one in one direction and another in an opposite direction. The rates of rotation of the shafts will be dependent on the diameters of the driven pulleys relative to that of the driving pulleys.

It is characteristic of my improvement that two or more driven pulleys are in frictional engagement with what might be termed the sides or legs of a belt passing around a single driving pulley. Or to state the improvement in another way, the driving pulley and a plurality of driven pulleys are partially inclosed by loops formed on an endless belt.

I claim herein as my invention:

1. A power transmitting mechanism having in combination a driving pulley, a plurality of driven pulleys, an idler and a belt inclosing said pulleys and idler in independent loops, the driven pulleys having their faces at right angles to the portion of the belt operating to drive the respective pulley.

2. A power transmitting mechanism having in combination a driving pulley, a plurality of simultaneously driven pulleys, an idler intermediate said driven pulleys as regards belt movement, and a belt inclosing said pulleys and idler in independent loops, the driven pulleys having their faces at right angles to the portion of the belt operating to drive the respective pulley.

3. A power transmitting mechanism having in combination a driving pulley, a plurality of driven pulleys, an idler and a belt passing around the idler and so arranged on the driven pulleys as to rotate the latter in opposite directions respectively, the driven pulleys having their faces at right angles to the portion of the belt operating to drive the respective pulley.

4. A power transmitting mechanism having in combination a driving pulley, a plurality of driven pulleys, an idler and a belt passing around the idler and frictionally engaging said pulleys, said elements being so constructed that different rates of rotation are imparted to the respective driven pulleys, the driven pulleys having their faces at right angles to the portion of the belt operating to drive the respective pulley.

5. A power transmitting mechanism having in combination a driving pulley, a plurality of shafts, fast and loose pulleys carried by each of the said shafts, a belt driven by the driving pulley and having successive loops adapted to engage the fast and loose pulleys, each of said loops being movable from its fast to its loose pulley and vice versa, without any shifting of the other loops.

6. A power transmitting mechanism having in combination a driving pulley, a plurality of simultaneously driven pulleys, an idler intermediate said driven pulleys as regards belt movement, a belt inclosing said pulleys and idler in independent loops, and means for adjusting the idler, the driven pulleys having their faces at right angles to the portion of the belt operating to drive the respective pulley.

In testimony whereof, I have hereunto set my hand.

FRANCIS A. STIERHEIM.

Witnesses:
 ALICE A. TRILL,
 THOS. B. JOYCE.

Copies of this patent may be obtained for five cents each, by addressing the "Commissioner of Patents, Washington, D. C."